(12) United States Patent
Liang et al.

(10) Patent No.: US 12,593,140 B2
(45) Date of Patent: Mar. 31, 2026

(54) AUTOMATIC WHITE-BALANCE (AWB) FOR A CAMERA SYSTEM

(71) Applicant: GOOGLE LLC, Mountain View, CA (US)

(72) Inventors: Liang Liang, San Diego, CA (US); Anirban Chatterjee, Santa Clara, CA (US); Nisha Masharani, San Francisco, CA (US); Eric Scott Penner, Redmond, WA (US); Isaac William Reynolds, Longmont, UT (US)

(73) Assignee: Google LLC, Mountain View, CA (US)

( * ) Notice: Subject to any disclaimer, the term of this patent is extended or adjusted under 35 U.S.C. 154(b) by 67 days.

(21) Appl. No.: 18/292,829

(22) PCT Filed: Oct. 12, 2021

(86) PCT No.: PCT/US2021/054630
§ 371 (c)(1),
(2) Date: Jan. 26, 2024

(87) PCT Pub. No.: WO2023/009155
PCT Pub. Date: Feb. 2, 2023

(65) Prior Publication Data
US 2024/0292115 A1 Aug. 29, 2024

Related U.S. Application Data

(60) Provisional application No. 63/203,640, filed on Jul. 27, 2021.

(51) Int. Cl.
| | |
|---|---|
| *H04N 23/88* | (2023.01) |
| *H04N 23/12* | (2023.01) |
(Continued)

(52) U.S. Cl.
CPC ............. *H04N 23/88* (2023.01); *H04N 23/12* (2023.01); *H04N 23/57* (2023.01); *H04N 23/611* (2023.01); *H04N 23/632* (2023.01)

(58) Field of Classification Search
CPC ...... H04N 23/61; H04N 23/611; H04N 23/88; H04N 1/6077
(Continued)

(56) References Cited

U.S. PATENT DOCUMENTS

| | | | |
|---|---|---|---|
| 6,700,999 | B1 | 3/2004 | Yang |
| 2003/0174215 | A1 | 9/2003 | Goldsmith |
(Continued)

FOREIGN PATENT DOCUMENTS

| | | | | |
|---|---|---|---|---|
| CN | 107071274 | B * | 8/2020 | ............. H04N 23/88 |
| EP | 1737247 | B1 | 3/2015 | |

OTHER PUBLICATIONS

Lucena et al., "Improving Face Detection Performance by Skin Detection Post-Processing," Conference Paper, ResearchGate, 2017, 9 pages.

*Primary Examiner* — Anthony J Daniels
(74) *Attorney, Agent, or Firm* — McDonnell Boehnen Hulbert & Berghoff LLP

(57) ABSTRACT

This document describes techniques and apparatuses for automatic white-balance for a camera system. The techniques and apparatuses utilize a precursor image to detect one or more detected faces and determine a tone. The camera system retrieves tonal data based on a group of images determined to contain a same face as the detected face. Based on this tonal data, a difference in white balance is determined based on the difference in tone of the detected face within the precursor image and the associated tonal (Continued)

data. Camera settings are adjusted based on the difference in white balance to enable capture of an image having an improved tone.

20 Claims, 18 Drawing Sheets

(51) Int. Cl.
  *H04N 23/57*          (2023.01)
  *H04N 23/611*        (2023.01)
  *H04N 23/63*          (2023.01)
(58) Field of Classification Search
  USPC ..................................................... 348/207.99
  See application file for complete search history.

(56)                    References Cited

U.S. PATENT DOCUMENTS

| | | | |
|---|---|---|---|
| 2008/0152228 A1* | 6/2008 | Tokuse | G06T 5/40 |
| | | | 382/190 |
| 2010/0231753 A1* | 9/2010 | Hagiwara | H04N 23/80 |
| | | | 348/E5.031 |
| 2011/0234845 A1 | 9/2011 | Fujiwara et al. | |
| 2012/0002849 A1 | 1/2012 | Tokuse | |
| 2013/0195319 A1 | 8/2013 | Petrescu et al. | |
| 2016/0275651 A1* | 9/2016 | Wang | H04N 23/741 |
| 2019/0222756 A1* | 7/2019 | Moloney | H04N 23/45 |
| 2019/0342491 A1* | 11/2019 | Mandavilli | H04N 23/611 |
| 2020/0036888 A1 | 1/2020 | Lee et al. | |
| 2021/0142042 A1 | 5/2021 | Sethi et al. | |
| 2021/0329208 A1* | 10/2021 | Huai | H04N 23/88 |
| 2022/0132023 A1* | 4/2022 | Kagaya | G06V 10/25 |
| 2023/0292020 A1* | 9/2023 | Qin | H04N 23/88 |

* cited by examiner

100

102

Electronic Device
102

Camera System
104

Camera Application
106

Actuator(s)
108

Display
110

Auto White-Balance Module
112

Tone Determination Module
114

White-Balance Controller
116

Frequent Face Module
118

Face Detector
120

Tone Temporal Filter
122

Image-Merging Module
124

Detect a face
1602

Determine a tone
1604

Retrieve tonal data
1606

Determine a difference
in WB between the
tone and the tonal data
1608

Adjust camera settings
1610

1700

Detect a face
1602

Determine a tone
1604

Retrieve tonal data
1606

Determine a difference
in WB between the
tone and the tonal data
1608

Determine priority value
1702

Detect additional face
1704

Adjust camera settings
1610

AUTOMATIC WHITE-BALANCE (AWB) FOR A CAMERA SYSTEM

This application is a national stage application under 35 U.S.C. § 371 of International Application No. PCT/US2021/054630, filed Oct. 12, 2021, which claims the benefit of U.S. Provisional Application No. 63/203,640, filed Jul. 27, 2021, the disclosures of which are explicitly incorporated by reference herein in their entirety.

BACKGROUND

Camera systems generally have many features usable to adjust characteristics (e.g., color, clarity, magnification) of an image or video. One such feature includes white balance (WB), which is a camera setting that adjusts how colors are rendered in an image. WB is generally used to cause objects that appear white to be rendered white in the image. To assist users, many cameras include an automatic white-balance feature (AWB), which automatically adjusts the WB according to a color-correction algorithm. Conventional camera systems, however, may not be able to achieve desired accuracy, particularly in portions of an image that are of the greatest importance, such as faces. Further, additional challenges arise when multiple portions of an image are identified as important. As a result, images may display WB issues, particularly at important portions of the image.

SUMMARY

This document describes techniques and apparatuses for automatic white-balance for a camera system. The techniques and apparatuses utilize a precursor image to detect one or more detected faces and determine a tone. The camera system retrieves tonal data based on a group of images determined to contain a same face as the detected face. Based on this tonal data, a difference in white balance is determined based on the difference in tone of the detected face within the precursor image and the associated tonal data. Camera settings are adjusted based on the difference in white balance to enable capture of an image having an improved tone. White balance adjustment and image tone may be improved, particularly in portions of an image that are of the greatest importance, such as faces.

Further, additional faces may be detected within the precursor image and through the steps disclosed, used to determine adjustments that may enable the capture of an image having an improved tone. These adjustments may be weighted, based on a priority value, to determine the adjustments that will improve the most important portions of an image. Alternatively, multiple images may be captured using separate adjustments to camera settings. These images may be provided to an image-merging module, which incorporates portions of each image to create a single image with improved tone.

This Summary is provided to introduce simplified concepts of techniques and apparatuses for AWB for a camera system, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of AWB for a camera system are described below. The use of the same reference numbers in different instances in the description and the figures indicate similar elements;

FIG. 7 illustrates an example of a set of matched images determined to contain a same face as a first detected face of FIG. 5;

FIG. 8 illustrates an example of a set of matched images determined to contain a same face as an additional detected face of FIG. 5;

DETAILED DESCRIPTION

Overview

This document describes techniques and apparatuses for AWB for a camera system. The techniques utilize a precursor image of a scene to detect a human face. A tone of the detected face is then determined and compared to tonal data associated with the detected face. The tonal data is determined from a set of previously captured images, captured in previous ambient conditions, determined to contain a same face as the detected face. The tonal data may describe the previous captured images, the group of previous captured images, or portions of the previous captured images. Through comparison of the tonal data to the tone of the detected face, a difference in AWB is determined and utilized to adjust camera settings that enable the capture of an image with an improved tone, for example when compared to an equivalent image captured without the adjusted camera settings. The improved tone may more-closely match the first tonal data than the tone of the detected face.

The improvements in tone may in particular correspond to portions of an image that are of the greatest importance, such as faces.

Additional faces may be detected within the precursor image and, through the above techniques, utilized to determine additional differences in AWB. The differences in AWB may be combined through a weighted sum, filtering, or any other computational method to adjust camera settings that enable the capture of an image with an improved tone. Alternatively, multiple images may be captured using separate adjustments to camera settings and provided to an image-merging module. The image-merging module incorporates portions of each image to create a single image with improved tone.

While features and concepts of the described techniques and apparatuses for AWB for a camera system can be implemented in any number of different environments, aspects are described in the context of the following examples.

Example Systems

Figure 1:
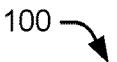
FIG. 1 illustrates an example operating environment for AWB for a camera system.

FIG. 1 illustrates an example operating environment 100 for AWB for a camera system 104 of an electronic device 102. The electronic device 102 includes the camera system 104. In the example operating environment 100, the camera system 104 consists of a camera application 106, which utilizes actuators 108 and a display 110. The camera system 104 further includes an auto white-balance (AWB) module 112 configured to determine tone within a portion of an image through use of a tone determination module 114 and control imaging sensors, such as RGB sensors, by utilizing a white-balance controller 116.

The camera system 104 also incorporates a frequent face (FF) module 118, which operates in conjunction with the AWB module 112. The frequent face module 118 includes a face detector 120 configured to detect a face within an image, and a tone temporal filter 122, which is configured to determine tonal data from individual tone determinations for a same face within one or more images. The tone temporal filter 122 may determine temporal data through summation, weighted summation, filtering, or any other computational method. The camera system 104 additionally includes an image-merging module 124 capable of creating a single image from multiple images of the same scene.

Figure 2:
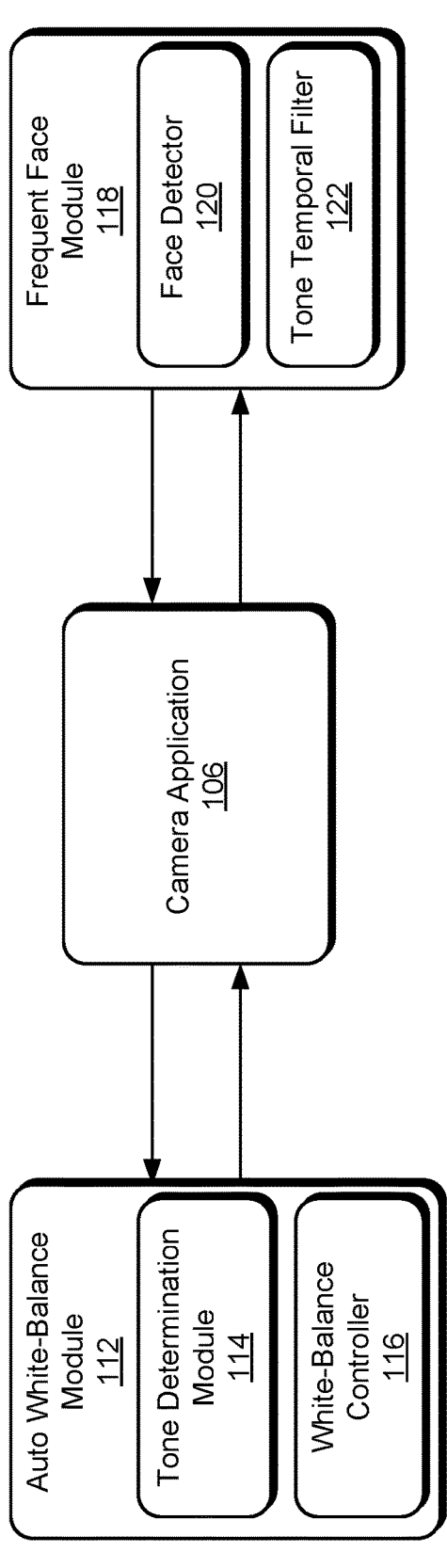
FIG. 2 illustrates an example implementation of an AWB module working in conjunction with a Frequent Face Module.

FIG. 2 illustrates an example implementation 200 of the AWB module 112 and FF module 118 of FIG. 1 operating in conjunction with one another. In example implementation 200, the camera application 106 provides an image to the FF module 118. The image provided may be a precursor image of a scene or a previously captured image. The face detector 120 detects a face within the image. The FF module may determine values associated with the detected face, such as a face-frequency value. The face-frequency value is particularly useful in instances when at least one additional detected face is detected within the precursor image. The face-frequency value is determined based on the number of previous images determined to contain a same human face as the detected face within the precursor image. Once processed the detected face and the image are provided to the camera application 106.

The camera application 106 provides these images to the AWB module 112, which processes the detected face along with data from the image and determines values associated with the detected face within the image, including a tone. The tone is determined using the tone determination module 114, however, the AWB module 112 may further determine a confidence value associated with the detected face within the image using ambient data (e.g., light data and face size data). The determined values, including tone, are output to the camera application 106 to be kept within the camera application 106, provided to the FF module 118, or both.

If provided to the FF module 118, the FF module 118 may use a tone temporal filter 122 to process the values into tonal data. The tonal data includes a more-accurate tone, which is calculated using tone values associated with the detected face within one or more images. Further, the more-accurate tone data may be calculated by combining tone values associated with the detected face within one or more images with confidence values associated with the detected face within the same images. These values can be combined through use of a weighted sum, filtering, or any other computational method. In addition, the tonal data may include a face-frequency value determined to be the number of images that contained a same face as the detected face.

The tonal data may be provided to the AWB module 112 and compared to the tone of the detected face within the precursor image. Based on the comparison, the WB controller 116 may determine a difference in WB between the tone of the detected face within the precursor image and the tonal data. Additionally, the WB controller 116 may adjust camera settings within the camera application 106 based on the difference in WB.

Figure 3:
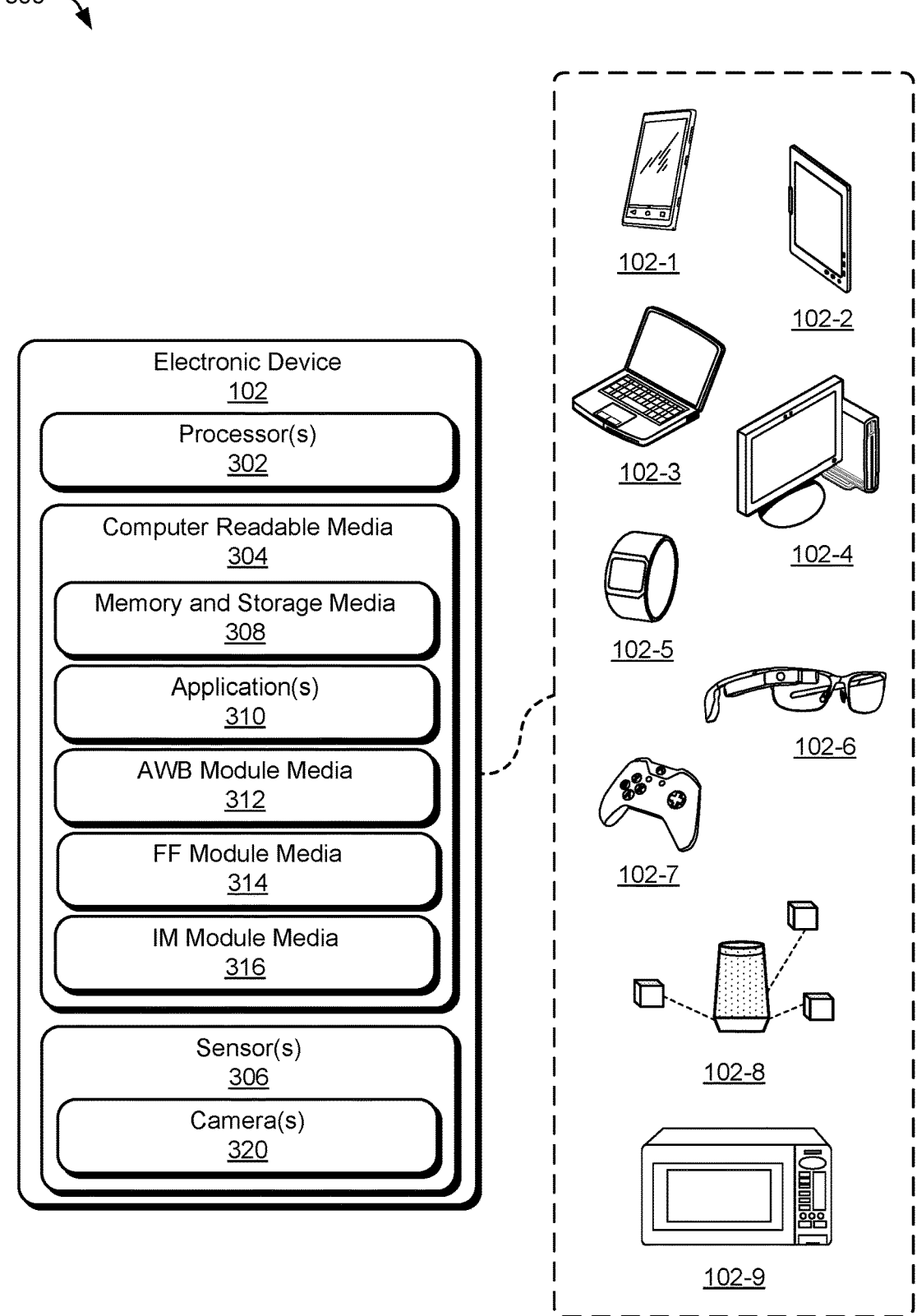
FIG. 3 illustrates a detailed example of the example operating environment of FIG. 1.

FIG. 3 illustrates a detailed example of the operating environment 100 of FIG. 1. Specifically, the electronic device 102 is illustrated through a variety of examples including: a smartphone 102-1, a tablet 102-2, a laptop 102-3, a desktop computer 102-4, a smartwatch 102-5, digital eyewear 102-6, an electronic controller 102-7, a home-automation and control system 102-8, and microwave 102-9. These are but some of the many electronic devices in which AWB for a camera system may be employed and can also include other devices, e.g., televisions, entertainment systems, audio systems, automobiles, drones, track pads, drawing pads, netbooks, e-readers, home security systems, and other home appliances. Note that the electronic device 102 can be mobile, wearable, non-wearable but mobile, or relatively immobile (e.g., desktops and appliances).

The electronic device 102 further includes one or more processors 302, computer-readable media 304, and one or more sensors 306. The computer-readable media 304 includes memory and storage media 308, applications 310, automatic white-balance (AWB) module media 312, frequent face (FF) module media 314, and image-merging (IM) module media 316. Applications 310 implemented as computer-readable instructions on the computer-readable media 304 can be executed by the computer processors 302 to provide some or all of the functionalities described herein. For example, the applications 310 may include or operate with a camera application (e.g., camera application 106), an AWB module (e.g., AWB module 112), or a FF module (e.g., FF module 118) to perform the AWB for a camera system. Further, the one or more sensors 306 may include one or more cameras 320 configured to capture images, video, and audio.

Figure 4:
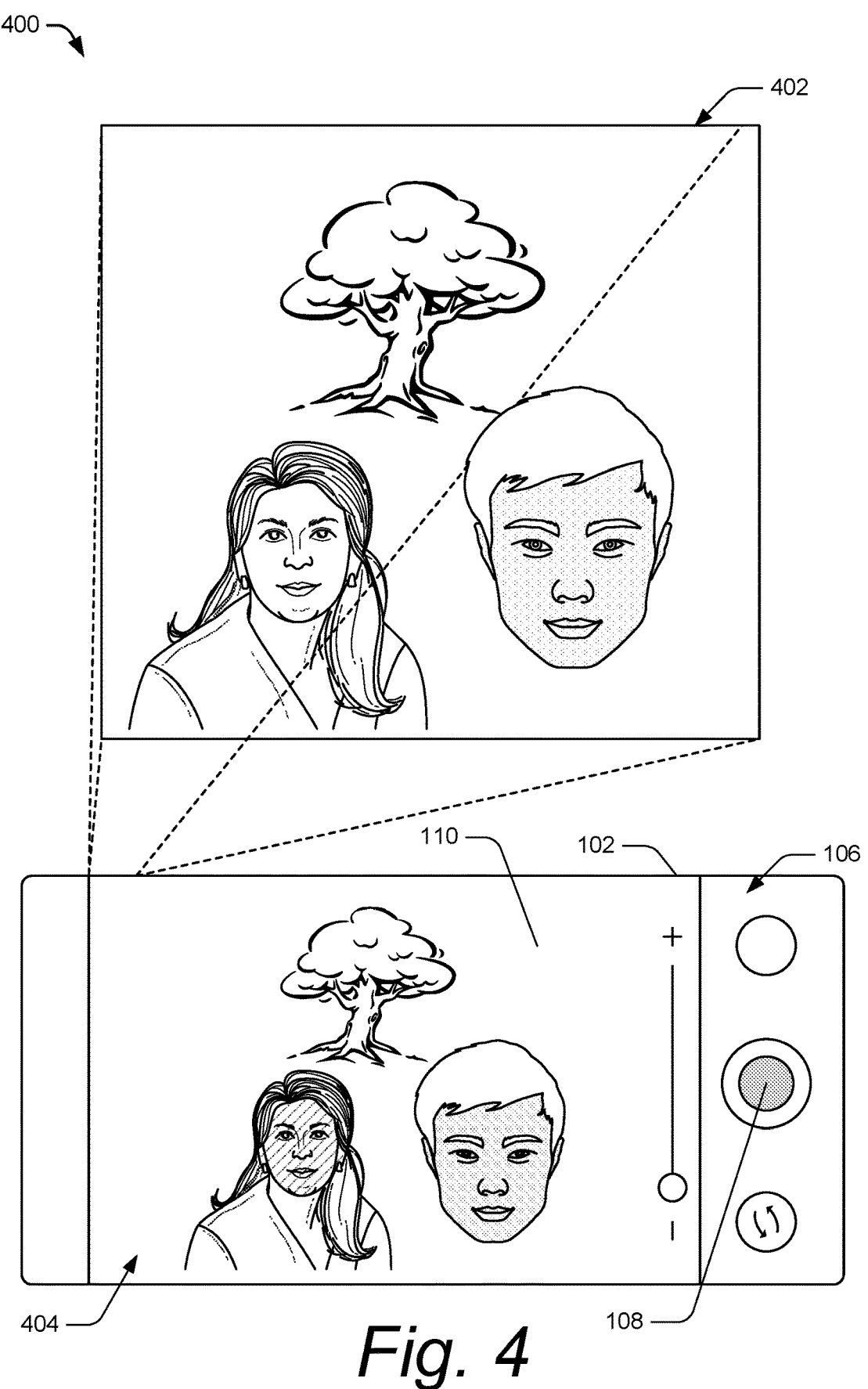
FIG. 4 illustrates an example implementation of capturing a precursor image within the context of AWB for a camera system.

FIG. 4 illustrates an example implementation of capturing, of a scene 402, a precursor image 404 within the context of AWB for a camera system. The electronic device 102 is shown with the camera application 106 active on the display 110. The camera application includes an actuator 108 that enables control on the camera application. The electronic device 102 is being used to capture the precursor image 404 of the scene 402 using one or more sensors. For example, the one or more sensors include a camera where the precursor image 404 is a digital image captured by the camera. However, the one or more sensors can be a low-resolution RGB sensor, or any other sensor usable to capture details from a scene that enable detection of a face and determination of a tone for the detected face. Additionally, one or more portions of the precursor image may appear different from the scene, in color or clarity, due to improper WB.

Figure 5:
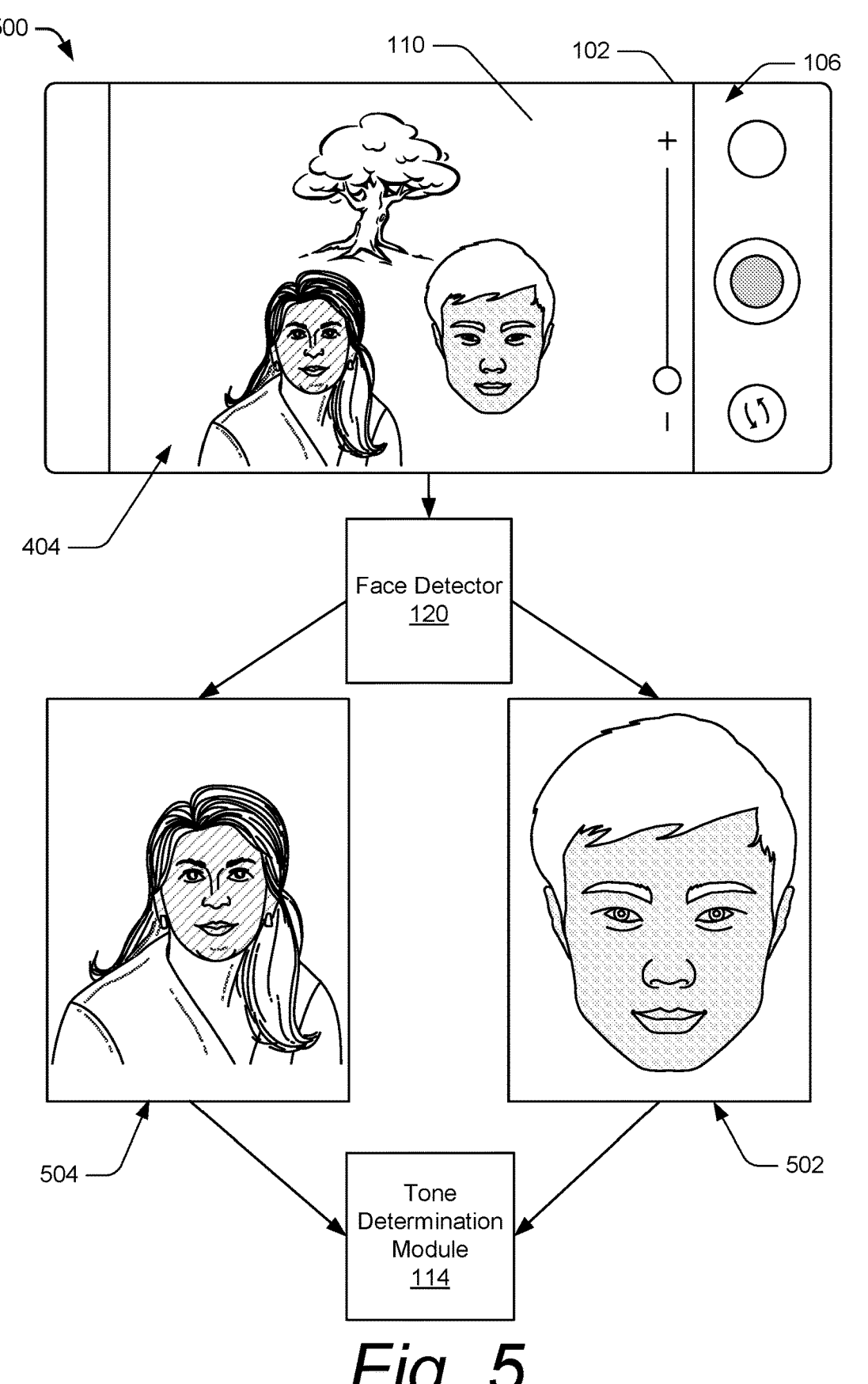
FIG. 5 illustrates an example implementation of detecting faces within the precursor image of FIG. 4.

FIG. 5 illustrates an example implementation of detecting faces within a precursor image (e.g., precursor image 404 of FIG. 4). The electronic device 102 is shown with the camera application 106 active and presenting the precursor image 404 on the display 110. Using the face detector 120, a first detected face 502 is detected within the precursor image 404. Optionally, the face detector 120 may detect additional detected faces, such as additional detected face 504.

Note that recognizing and tracking a detected face, or an identity associated with the detected face, is not required by the face detector 120. Instead, the face detector 120 may classify features associated with the detected face to later match the features temporarily to those from other images. Although the classified features can be used to match the detected face to faces from other images, the classified features associated with the detected face need not be used to determine the identity associated with the detected face. Rather, the classified features can simply be used to match the detected face to faces from other images without an actual identity of the person being used. In this way, server storage, facial identification, and facial recognition are not required, thus protecting the identity associated with the face detected by the face detector 120.

Once detected, the first detected face 502 is provided to the tone determination module 114 to determine a tone of the first detected face 502 within the precursor image 404. The tone determination module may determine an additional tone for the additional detected face 504 within the precursor image 404. Due to improper WB within the precursor image, the first detected face 502 may appear to have an incorrect or altered tone to that of a same face within a scene (e.g., scene 402).

Figure 6:
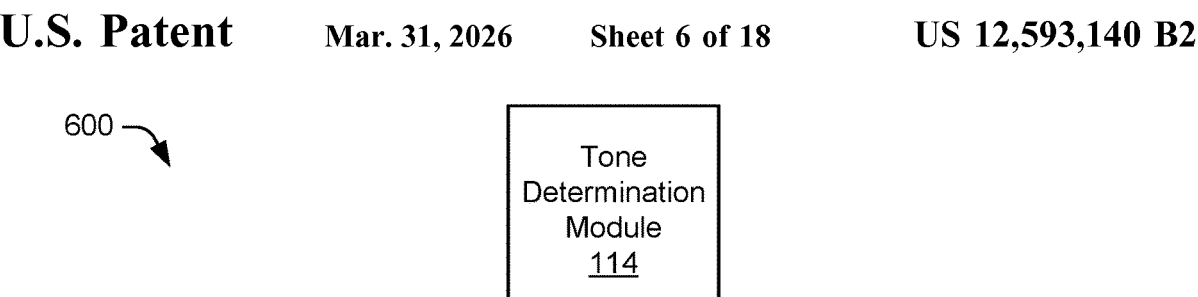
FIG. 6 illustrates example implementation of tone determination by a tone determination module.
Figure 6:
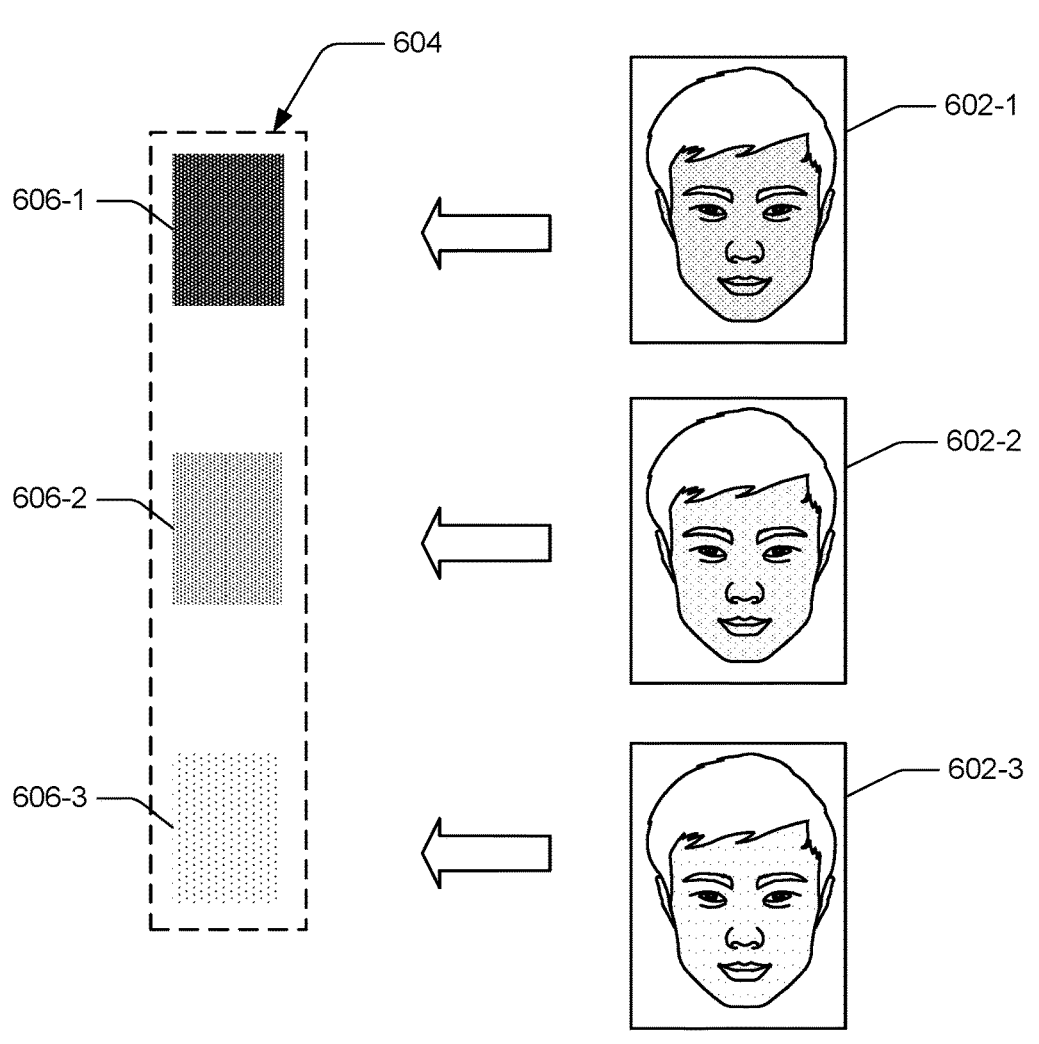

Consider FIG. 6, which illustrates an example implementation of tone determination using a tone determination module (e.g., tone determination module 114). The tone determination module 114 is provided a detected face 602 (e.g., detected face 602-1, detected face 602-2, detected face 602-3). The tone determination module 114 determines a tone for the detected face 602 by correlating the detected face 602 to a tone 606 from within a set of tones 604. Once the detected face 602 has been correlated to the tone 606 from within the set of tones 604, the tone 606 may be provided to one or more modules (e.g., AWB module 112 and FF module 118) or one or more applications (e.g., camera application 106).

The set of tones 604 may be created through predetermined values, machine-learning techniques, or any other computational method. Similarly, the determination of the tone for a detected face 602 may be determined through a predetermined set of decisions (e.g., a decision tree), machine learning, and the like. The use of machine learning may include supervised or unsupervised learning through use of neural networks, including perceptron, feedforward neural networks, convolutional neural networks, radial basis function neural networks, or recurrent neural networks. In an example, the machine learning model may be trained through supervised machine learning. In supervised machine learning example, a labeled set of previous image captures identifying a detected face within the image can be given to build the machine-learning model. These faces may be classified by a tone value as to train the machine learning model and build to set of tones 604. Through this supervised machine learning, detected faces input to the tone determination module 114 may receive more accurate determination of tone. Future tone determinations may be fed-back into the model and marked as correct or incorrect determinations to further train the model. The tone determination module 114 may also determine that the tone 606 of the detected face 602 is not within the set of tones 604 and add it to the set of tones 604.

Figure 7:
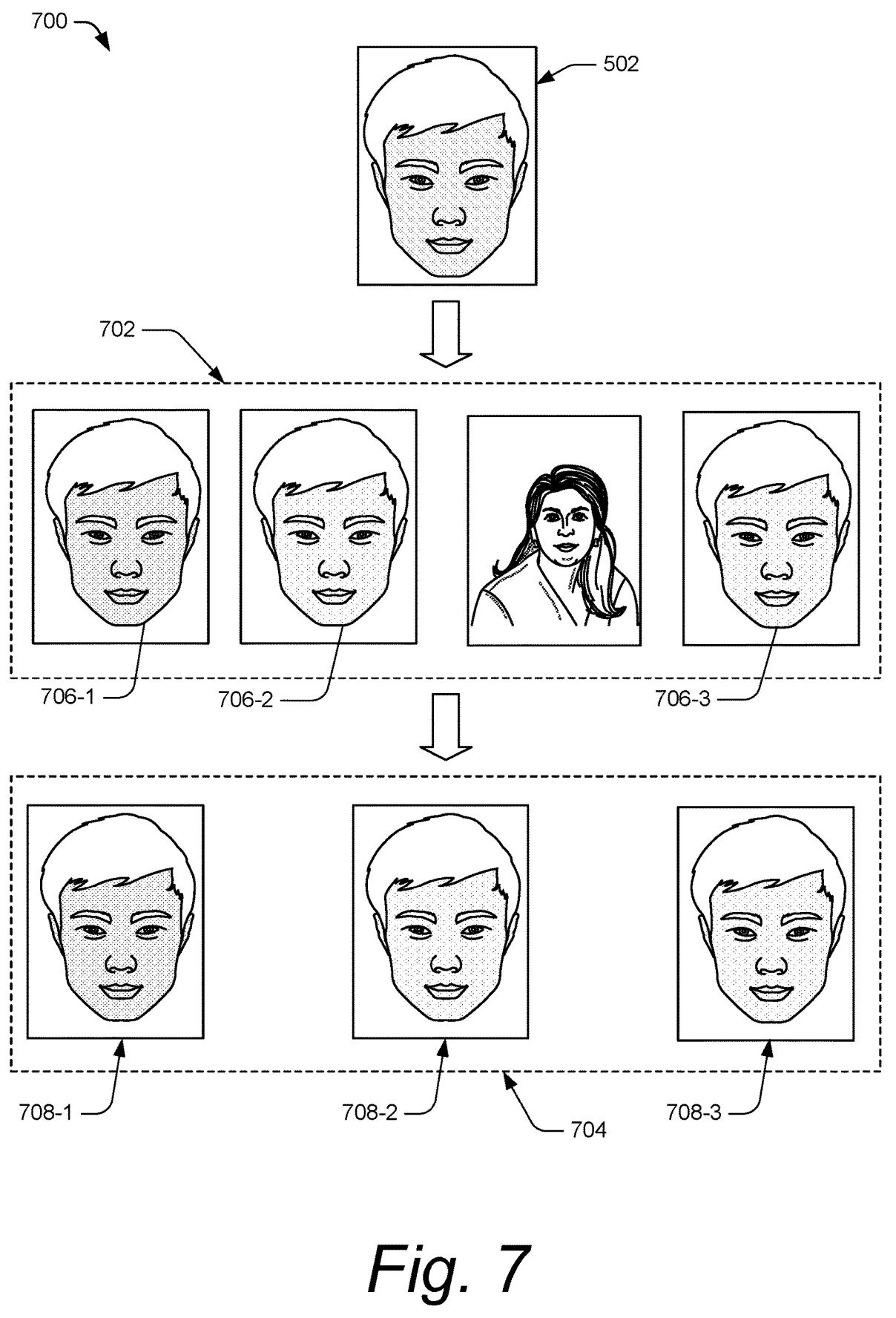

Once a first detected face (e.g., first detected face 502) has been detected and a tone has been determined, a group of previous images 702 are retrieved. FIG. 7 illustrates an example implementation in which a same face as the first detected face 502 is detected within a group of previous images 702. The group of previous images 702 captured at previous ambient conditions are retrieved. The previous images 702 may be retrieved from any image storage medium including on-device image storage and cloud-based image storage. After the group of previous images 702 are retrieved, a face detector (e.g., face detector 120) is used to determine which, if any, of the group of previous images 702 contain, to place into a group of matched images 704, a same face 706 (e.g., same face 706-1, same face 706-2, and same face 706-3) as the first detected face 502. A previous image 708 determined to contain the same face 706 as the first detected face 502, such as previous image 708-1, previous image 708-2 and previous image 708-3, is placed into the group of matched images 704. The group of matched images 704 may be provided to one or more modules (e.g., AWB module 112 and FF module 118) or one or more applications (e.g., camera application 106).

Figure 8:
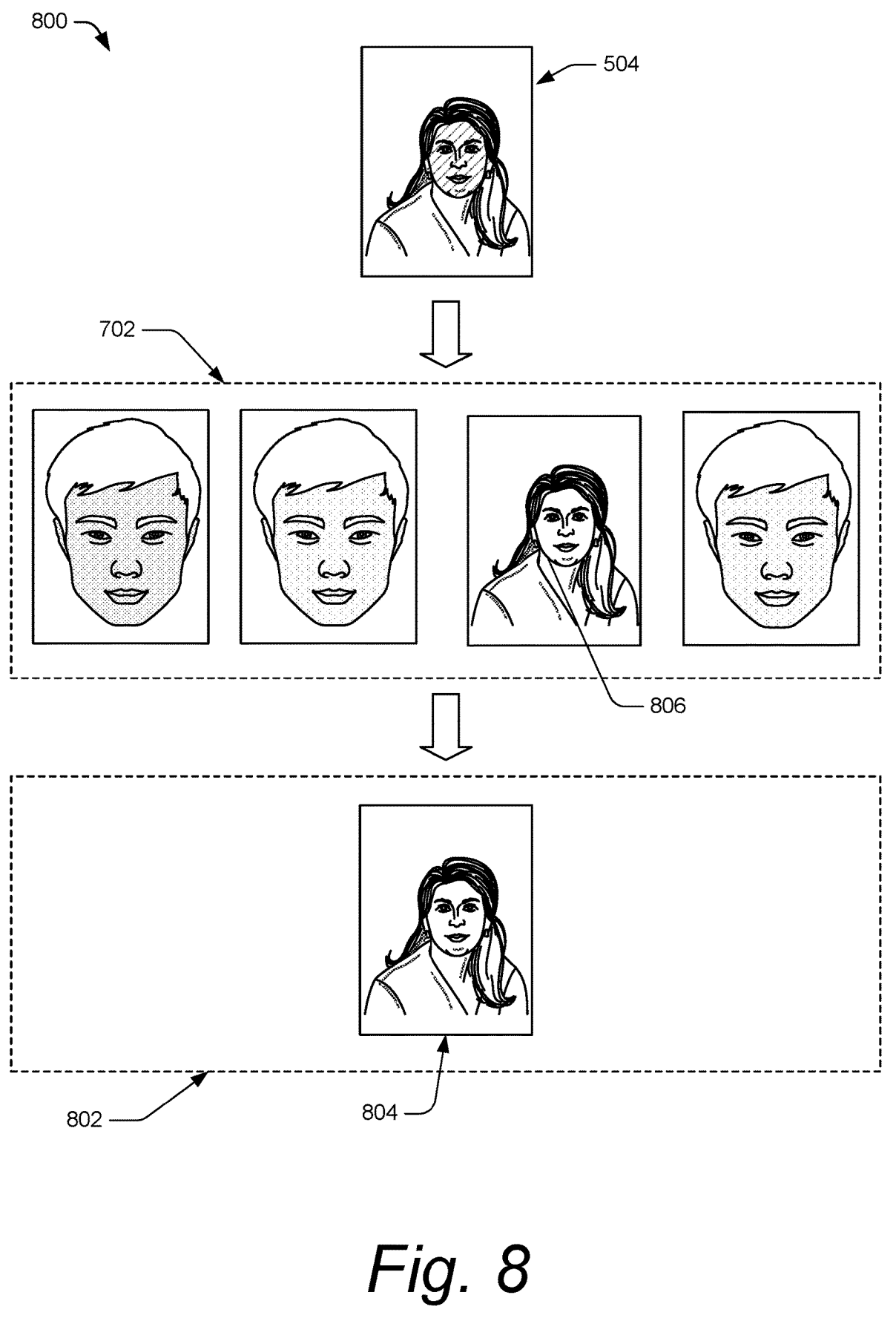

FIG. 8 illustrates an example implementation in which a group of matched images 802 are determined to contain a same face as an additional detected face 504 within a precursor image (e.g., precursor image 404). Similar to FIG. 7, a group of previous images 702 are retrieved from an image storage medium. In this example, the group of previous images 702 is the same group of images as in FIG. 7, although this group can be different, in whole or in part, from the previous group of images 702 utilized for a first detected face (e.g., the first detected face 502). Again, a face detector (e.g., face detector 120) is used to determine that previous image 804 contains a same face 806 as the additional detected face 504. As such, previous image 804 is placed into a group of matched images 802.

Figure 9:
FIG. 9 illustrates an example implementation of determining tone from the group of matched images of FIG. 7.
Figure 9:
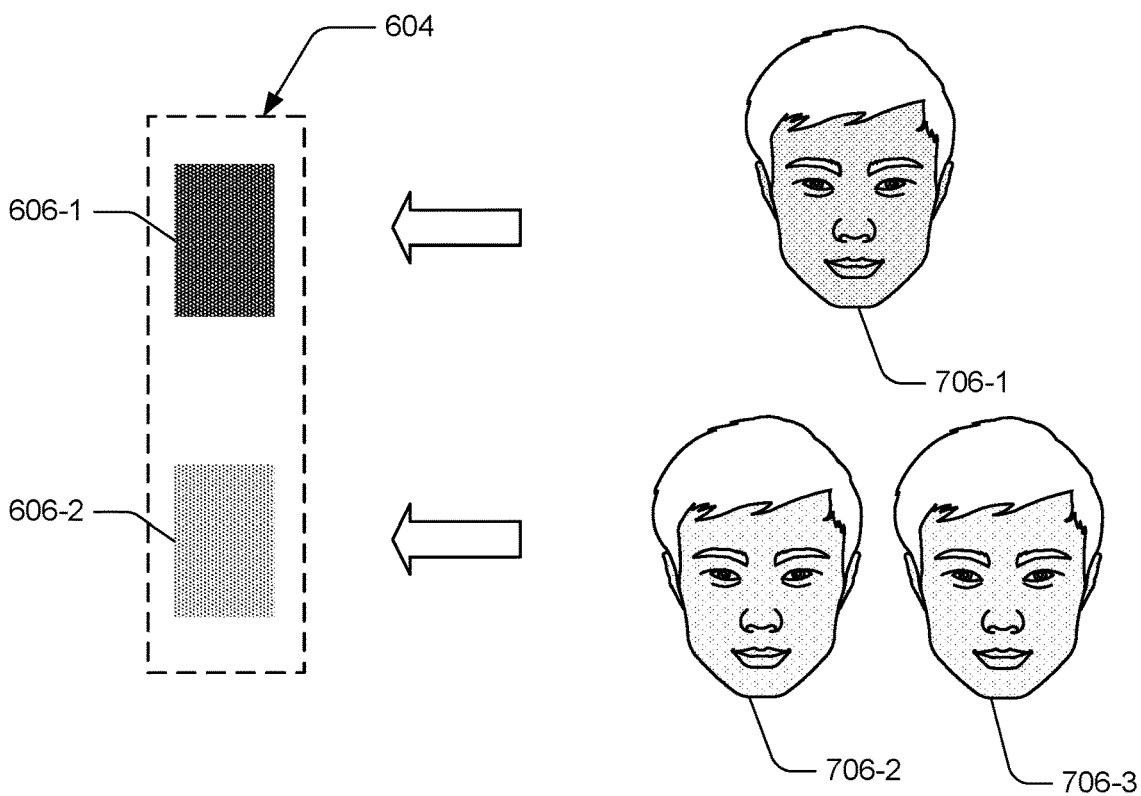

In FIG. 9, the tone determination module 114 is used to determine a tone 606 for each same face 706 (e.g., same face 706-1, same face 706-2, same face 706-3) within the group of matched images (e.g., group of matched images 704). Similar to the example implementation of FIG. 6, the tone determination module 114 determines a tone 606 for each same face 706 from the set of tones 604. For example, using the tone determination module 114, same face 706-1 is determined to have a tone 606-1. Similarly, same face 706-2 and same face 706-3 are determined to have the same tone 606-2. These tones 606, associated with the same faces 706 may be provided to one or more modules (e.g., AWB module 112 and FF module 118) or one or more applications (e.g., camera application 106).

Figure 10:
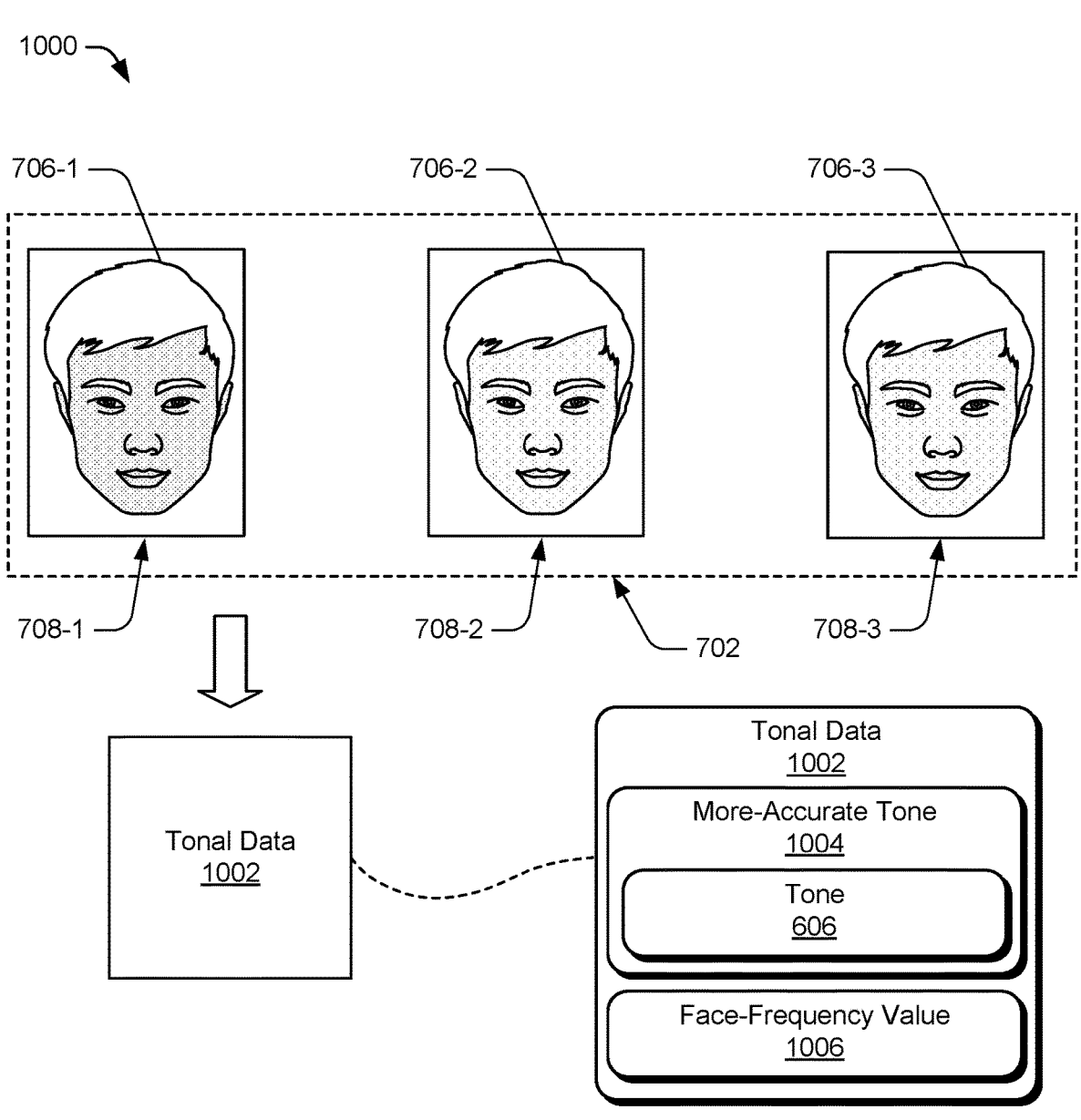
FIG. 10 illustrates an example of tonal data from the group of matched images of FIG. 7.

FIG. 10 illustrates an example in which tonal data 1002 is determined from the group of matched images 704 determined to contain the same face 706 as a detected face (e.g., first detected face 502). The tonal data 1002 is a set of data that is associated with a detected face (e.g., first detected face 502) and determined from a group of matched images 704. The group of matched images 704 is a group of previous images 708 determined to contain the same face 706 as a detected face (e.g., first detected face 502). In a simplified example, the tonal data 1002 is made up of only a more-accurate tone 1004. The more-accurate tone 1004 is determined through combining tone 606 for each same face 706. The tone 606 for each same face 706 may be combined through any computational method, the simplest of which being an averaging of the tones to produce the more-accurate tone value.

A more-complex example of tonal data, such as tonal data 1002 from FIG. 10, includes a face-frequency value 1006. The face-frequency value 1006 is computed by determining the number of previous images 708 in the group of matched images 704. Stated broadly, the face-frequency value 906 is based on the number of previous images 708 determined to contain the same human face 706 as a detected human face (e.g., first detected face 502). The face-frequency value 1006 is particularly useful in instances in which one or more additional detected faces (e.g., additional detected face 504) are detected within a precursor image. In such instances, the face-frequency value 1006 may be used to determine the most important of the detected faces (e.g., first detected face 502 and additional detected face 504).

For example, a face detector detects a first detected face and an additional detected face within a precursor image, prompting the disclosed camera system to determine a tone of each detected face within the precursor image and determine a group of matched images for each detected face. Using the techniques disclosed, the group of matched images produces tonal data, including a more-accurate tone value and a face-frequency value. The tone of each detected face within the precursor image is compared to the more-accurate tone value of the tonal data associated with each detected face to determine camera setting adjustments that will minimize the difference between the tone of the detected face and the associated more-accurate tone. In this example, two sets of camera adjustments will be provided, one for each detected face within the precursor image. Using the face-frequency value, a priority value is created to determine the most-important face, or faces, within the precursor image. This priority value can be used to combine the two sets of camera adjustments using a weighted sum. In this way, detected faces with the highest priority value, and thus determined to be most important, will have the greatest impact on camera setting adjustments.

Priority value can be calculated through different methods, such as assigning priority values based solely on face-frequency value. Alternatively, or in conjunction, the face size of the detected faces within the precursor image may be used to determine priority values. Specifically, the detected faces with larger face size are given higher-priority values.

Figure 11:
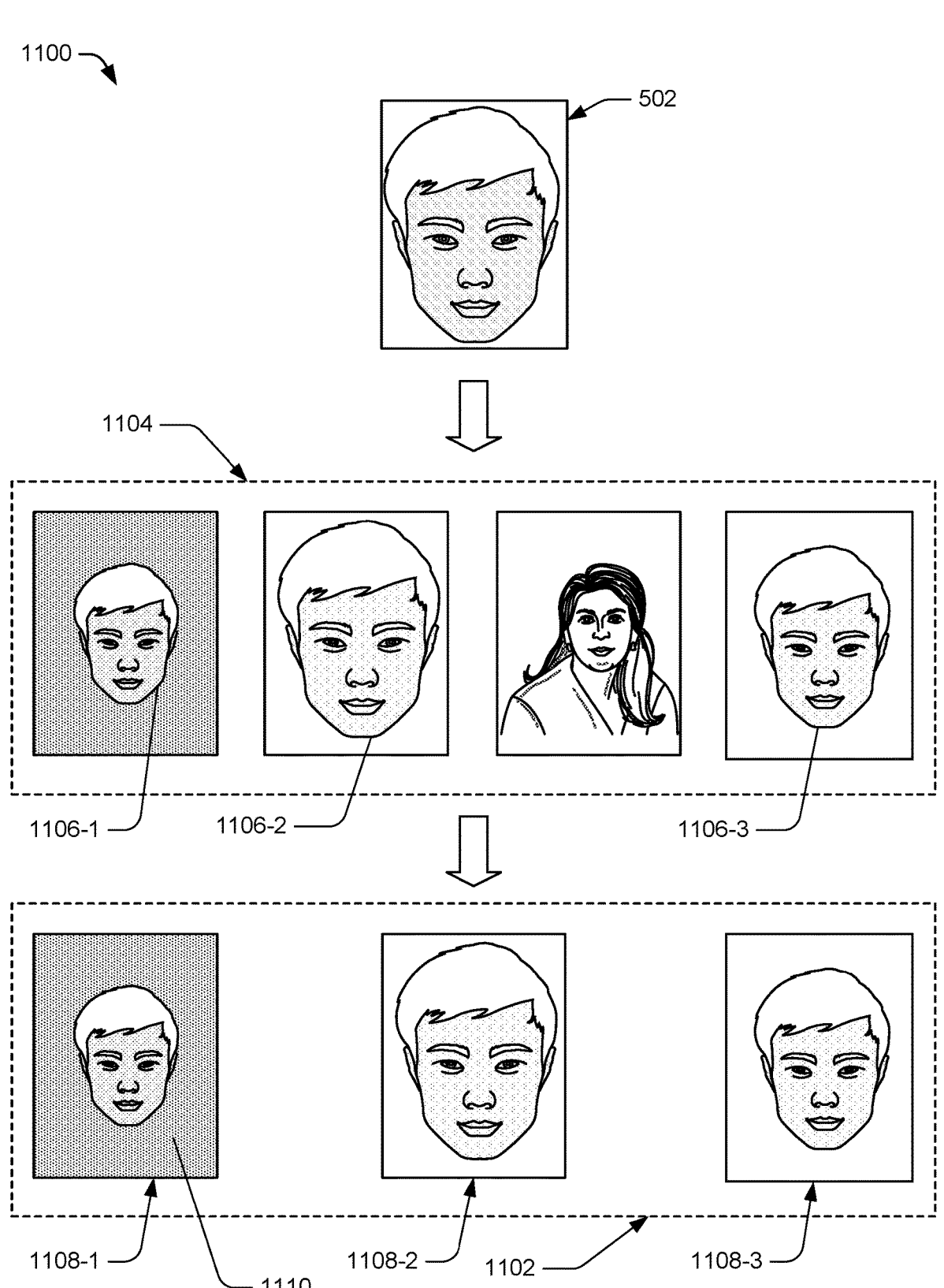
FIG. 11 illustrates an example of another set of matched images determined to contain a same face as a first detected face of FIG. 5.

FIG. 11 illustrates a more-complex example of a set of matched images determined to contain a same face as a first detected face 502. Like in FIG. 7, a group of previous images 1104 are retrieved and searched for a same face 1106 (e.g., same face 1106-1, same face 1106-2, same face 1106-3) as the first detected face 502. Once again, the previous images 1108 (e.g., previous image 1008-1, previous image 1008-2, and previous image 1008-3) determined to contain a same face 1106 as the first detected face 502 are collected into a group of matched images 1102. Different from FIG. 7, the previous images 1108 in the group of matched images 1102 contain the same face 1106 subject to various ambient conditions 1110 that alter image elements such as lighting and face size.

Figure 12:
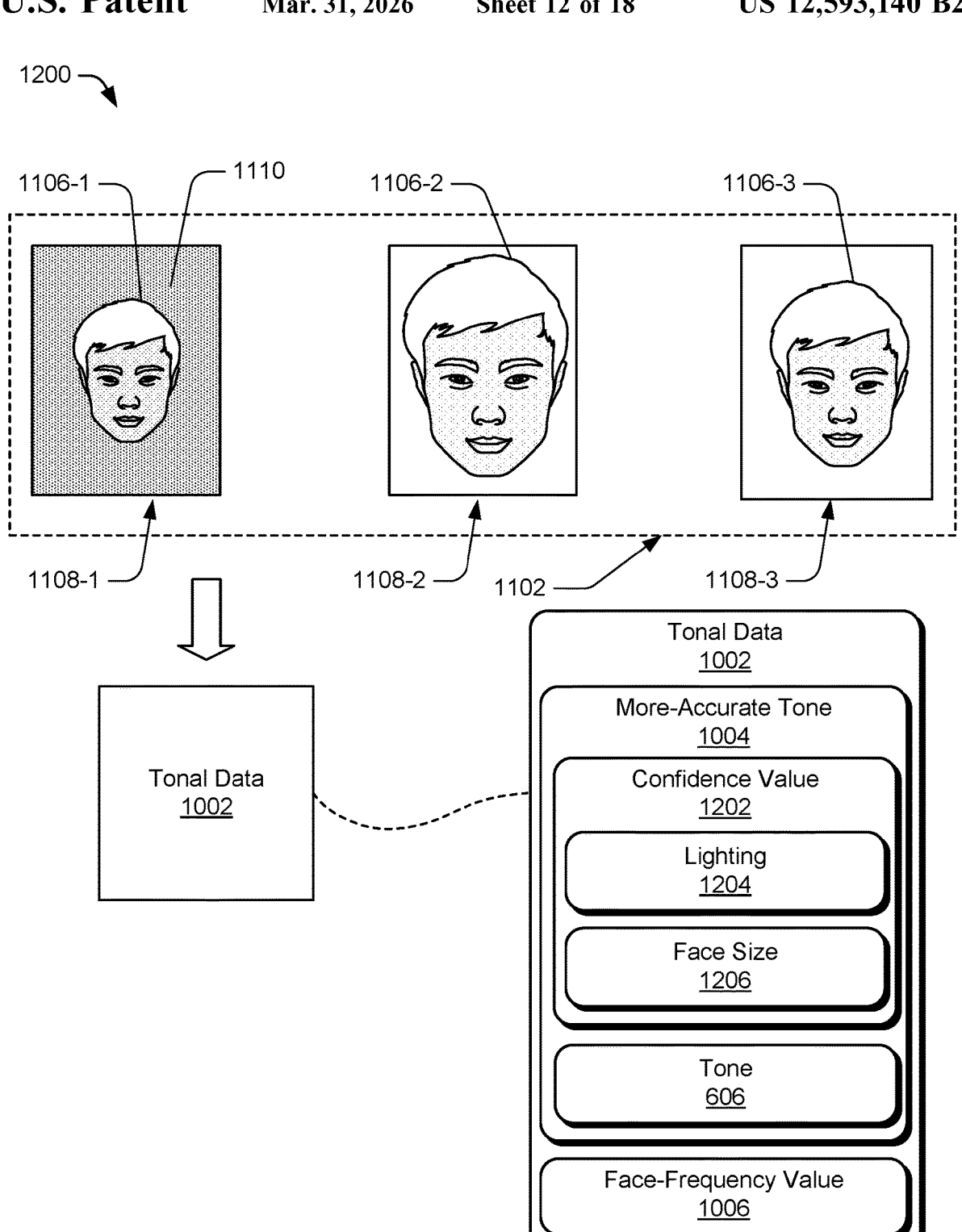
FIG. 12 illustrates an example of tonal data from the group of matched images of FIG. 11.

FIG. 12 illustrates an example of tonal data 1002 from the group of matched images 1102 of FIG. 11. Similar to FIG. 10, the tonal data 1002 is a set of data containing the more-accurate tone 1004 associated with a detected face (e.g., first detected face 502) and determined from the group of matched images 1102. The tonal data 1002 may also contain the face-frequency value 1006 and each of the same faces 1106 within the previous images 1108 from the group of matched images 1102 are associated with a tone 606 like in FIG. 10. In contrast to FIG. 10, the more-accurate tone 1004 is now determined through combination of a confidence value 1202 and the tones 606. The confidence value 1202 represents a certainty in the determination of tone 606 from each of the same faces 1106.

Recall that the group of matched images 1102 contains the same face 1106 subject to various ambient conditions 1110. Using data, such as face size 1206 and lighting 1204 collected from the ambient conditions 1110, the confidence value 1202 can be determined for the tone 606 of each same face 1106. For example, previous images 1108 where the ambient condition 1110 includes low-light conditions may be given a low confidence value due to the added variability of tone determinations in said lighting 1204. Alternatively, or in conjunction, previous images 1108 where the ambient condition 1110 includes a small face size 1206 may be given a low confidence value due to the added variability of tone determinations in smaller portions of the image.

After the tone 606 and associated confidence value 1202 of each same face 1106 has been determined, the more-accurate tone 1004 can be determined for a detected face (e.g., first detected face 502). The more-accurate tone 1004 can be determined through any combination of the tone 606 and the confidence value 1202. One example method of combination includes a weighted sum, wherein the tone 606 of each same face 1106 is weighted by the associated confidence value 1202 and summed. Another example method includes filtering, wherein only a subset of the tones 606 of the same faces 1106 having the highest associated confidence value 1202, are used to determine the more-accurate tone 1004. Additionally, filtering may be used in combination with a weighted sum such that the tones 606 are filtered and then weighed by confidence value 1202.

Figure 13:
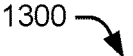
FIG. 13 illustrates an example implementation of AWB for a camera system within an electronic device.
Figure 13:
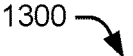

FIG. 13 illustrates an example implementation of AWB for a camera system within an electronic device. Once a more-accurate tone decision has been made for a detected face (e.g., first detected face 502), the tone of the detected face is compared to the more-accurate tone value. Through comparison, a difference in WB between the tone of the detected face within the precursor image and the more-accurate tone determined for the detected face is determined. Based on the difference in WB, camera settings are adjusted to enable the electronic device 102 to capture an image with improved tone 1302. The camera setting adjustments may entail any adjustment that enables capture of an image with improved tone 1302 such as altering of RGB sensor gain including red, green, and blue sensor gain. The camera may then capture the image with improved tone 1302 and provide it to a display 110.

In a simple example of AWB for a camera system, only one detected face is detected within the precursor image. As such, one tonal data is retrieved, one difference in WB is determined, and camera settings are adjusted based on one difference in WB. However, more complex examples include one or more additional detected faces within the precursor image. In this example, multiple tonal data are retrieved, multiple differences in WB are determined, and camera settings are adjusted based on multiple differences in WB. A priority value may be determined for a first detected face and each additional detected face within the precursor image. The priority value may be determined based on the tonal data, the precursor image, or a combination of the two. For example, a detected face may be given a higher priority value if the tonal data associated with the detected face includes a higher face-frequency value, which indicates that the detected face is frequently captured by the camera system. In addition, or separately, a detected face may be given a higher priority value if the detected face has a larger face size within the precursor image. Once a priority value has been determined for each of the detected faces, the camera settings are adjusted based on the differences in WB and the priority values. The differences in WB and the priority values may be combined through any computational method, including weighted sums and filtering.

In a specific example, a first detected face is detected within the precursor image along with one to 19 additional detected faces. Tonal data is retrieved for each detected face and a difference in AWB is determined based on the tonal data. A priority value is also determined for each detected face within the precursor image. The up to 20 detected faces are filtered based on priority value to create a subset of the detected faces with the associated tonal data and differences in AWB. Once filtered, the camera settings may be adjusted based on a weighted sum of the subset of detected faces with the 5 highest priority values such that the differences in WB are weighted by the priority value. It should be noted that the detected faces and associated tonal data may be filtered to any desired subset and the example provided is merely given to illustrate a specific method of combining the differences in WB for multiple detected faces.

Figure 14:
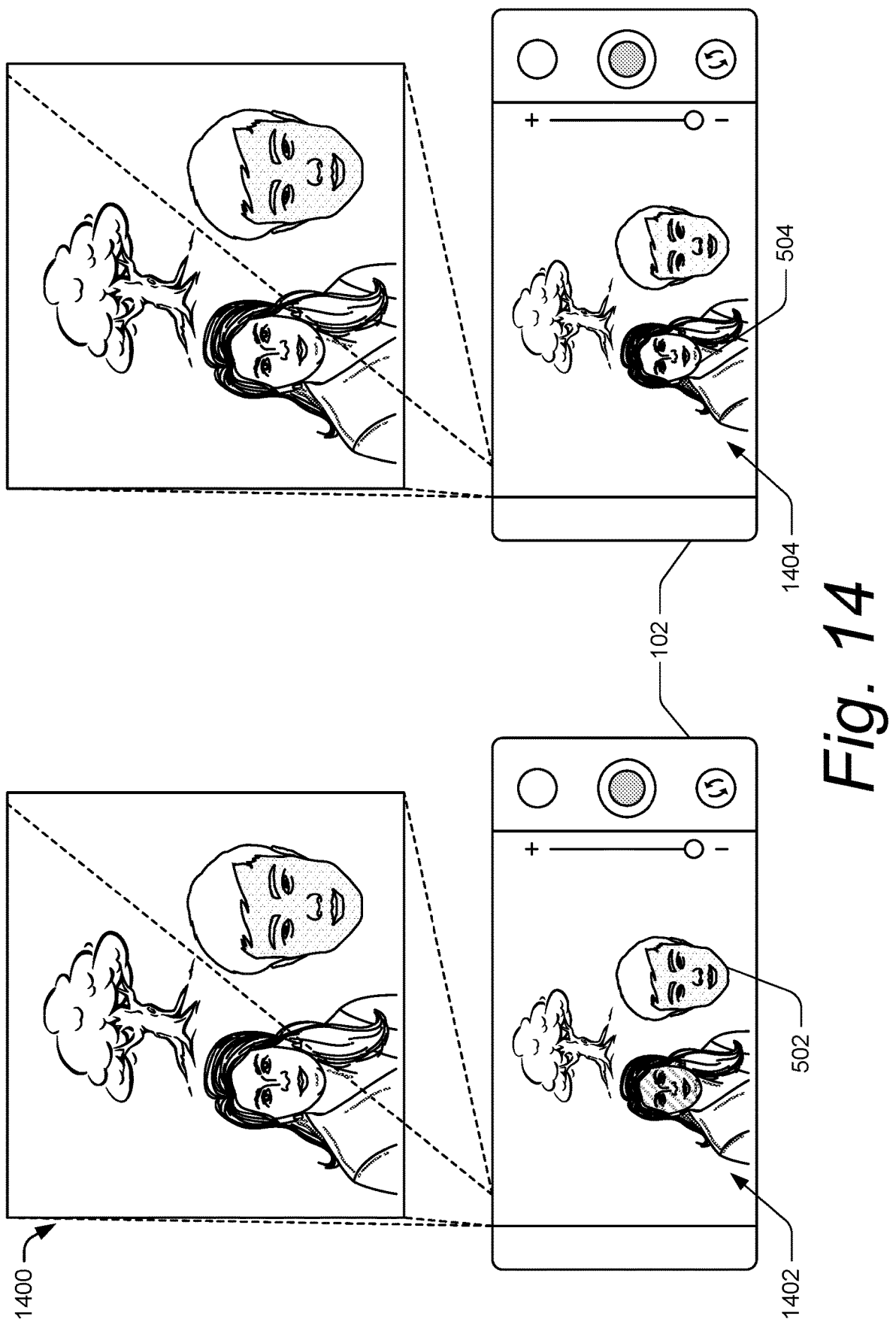
FIG. 14 illustrates another example implementation of AWB for a camera system within an electronic device.

FIG. 14 illustrates another example implementation of AWB for a camera system within the electronic device 102 wherein multiple images (e.g., a first image 1402 and an additional image 1404) are captured with different camera setting adjustments. In an aspect, the first detected face 502 and the additional detected face 504 are detected within a precursor image. Tonal data is retrieved for each detected face and used to determine a difference in WB associated with the first detected face 502 and a difference in WB associated with the additional detected face 504. Camera settings are adjusted based on the difference in WB associated with the first detected face 502, which captures the first image 1402 with an improved tone in the first detected face 502. The camera settings are then adjusted based on the difference in WB associated with the additional detected face 504 and the additional image 1404 is captured with an improved tone in the additional detected face 504. It should be noted that the first image 1402 and the additional image 1404 may be captured with the same camera or separate cameras, one or more images may be saved to memory, and the camera system may capture one or more additional images with adjusted camera settings.

Figure 15:
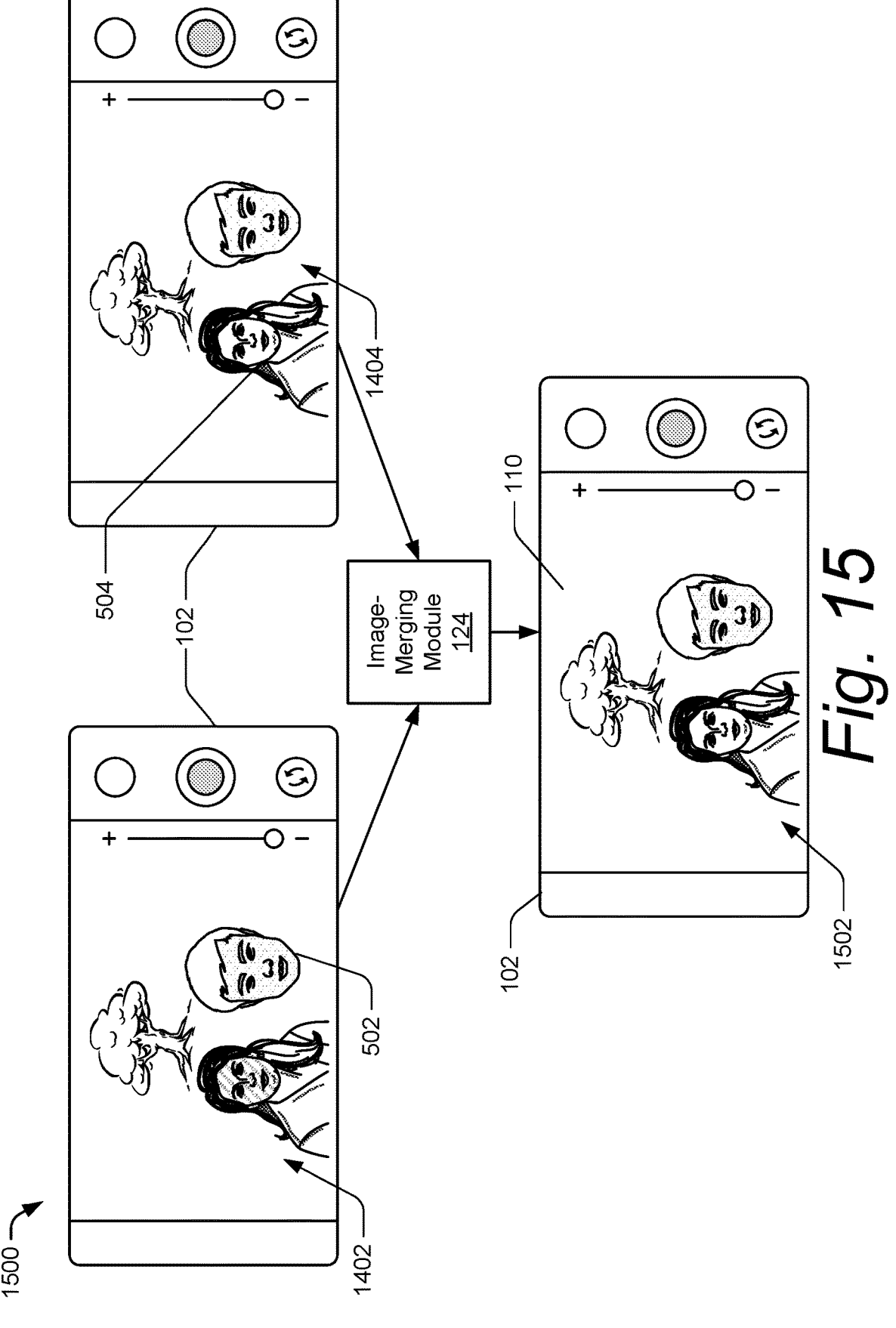
FIG. 15 illustrates an example implementation of an image-merging module for the example implementation of AWB of FIG. 14.

FIG. 15 illustrates an example implementation of an image-merging module 124 of a camera system performing AWB. Two images are shown: the first image 1402 has an improved tone in the first detected face 502 and the additional image 1404 has an improved tone in the additional detected face 504. The first image 1402 and the additional image 1404 are provided to the image-merging module 124. The image-merging module 124 uses image stitching to incorporate the first image 1402 and the additional image 1404 into a single image 1504 which has an improved tone in the first detected face 502 and the additional detected face 504. The image-merging module 124 incorporates the first image 1402 for the first detected face 502 and the additional image 1404 for the additional detected face 504. After producing the single image 1504, it is provided to a display 110 on the electronic device 102 to be digitally displayed. In addition, the single image 1504 may be stored within the electronic device or via any other image-storing medium.

Further, additional images may be provided to the image-merging module 124 and the single image 1502 may be produced through the image-merging module 124 by incorporating additional images for the additional detected faces within the precursor image. As a result, the single image 1502 will have improved tone in each of the detected faces.

Example Methods

Figure 16:
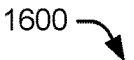
FIG. 16 illustrates an example method of AWB for a camera system.
Figure 16:
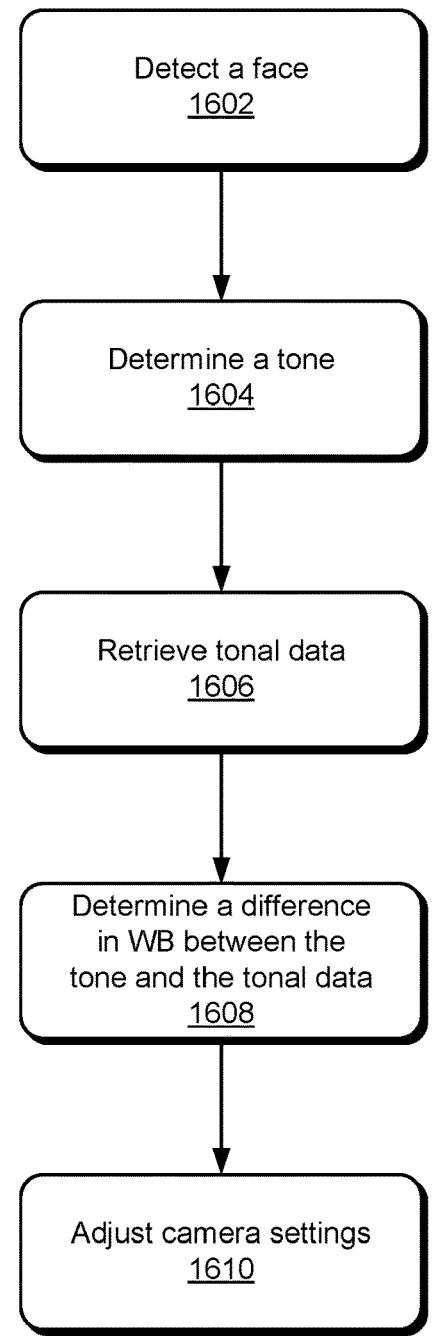

FIG. 16 illustrates an example method of AWB for a camera system. At 1602, a detected face is detected within a precursor image of a scene. Face detection can be performed through any facial detection method including knowledge-based, feature-based, template matching, or appearance-based facial detection.

At 1604, a tone of the detected face is determined within the precursor image. The tone of the detected face may be determined from a predetermined set of tone values or a continually built set of tone values. The tone determination may be performed through machine learning methods, including supervised or unsupervised learning. Additionally, the tone determination may be pre-trained or trained over time.

At 1606, tonal data associated with the detected face is retrieved. A group of previous images captured in previous ambient conditions is used to determine a group of matched images. The group of matched images are determined to contain a same face as the detected human face. The same face within the previous images may be detected through the same, or similar methods, as the detected face within the previous images. The tonal data contains tones usable to determine a more-accurate tone value, though tonal data may also contain additional data about the same faces within the previous images and the previous images themselves. This data may include ambient conditions, such as the size of the same face within the previous image and the lighting within the previous image. As an example, the ambient conditions may be used to determine a confidence value for the tone associated with the same face in each of the previous images. The confidence values may be used in combination with the tone of the same faces to determine a more-accurate tone. Additionally, the tonal data may contain data usable to assist in the determination of a priority value such as a face-frequency value associated with the detected face.

At 1608, a difference in WB is determined between the tone of the detected face and the tonal data. This difference may be determined based solely or in part on a difference between the tone of the detected face and the more-accurate tone from the tonal data. The difference in WB is a determined difference in camera settings to align the tone of the detected face in the precursor image to the more-accurate tone from the tonal data. The difference in WB may be represented as a change in RGB sensor gain values including red, green, and blue sensors.

At 1610, camera settings are adjusted based on the difference in WB. The camera setting adjustments may include adjusting the camera sensor gain values, including RGB sensor gains. By adjusting the camera settings, the camera system will be able to capture an image of the scene having an improved tone, for example compared to an image of the scene that would have been captured were the camera settings not adjusted. Additionally, adjusting the camera settings may cause the camera to capture an image of the scene having an improved tone. The captured image may be provided to a display to be displayed digitally, stored in an electronic device, or both.

Figure 17:
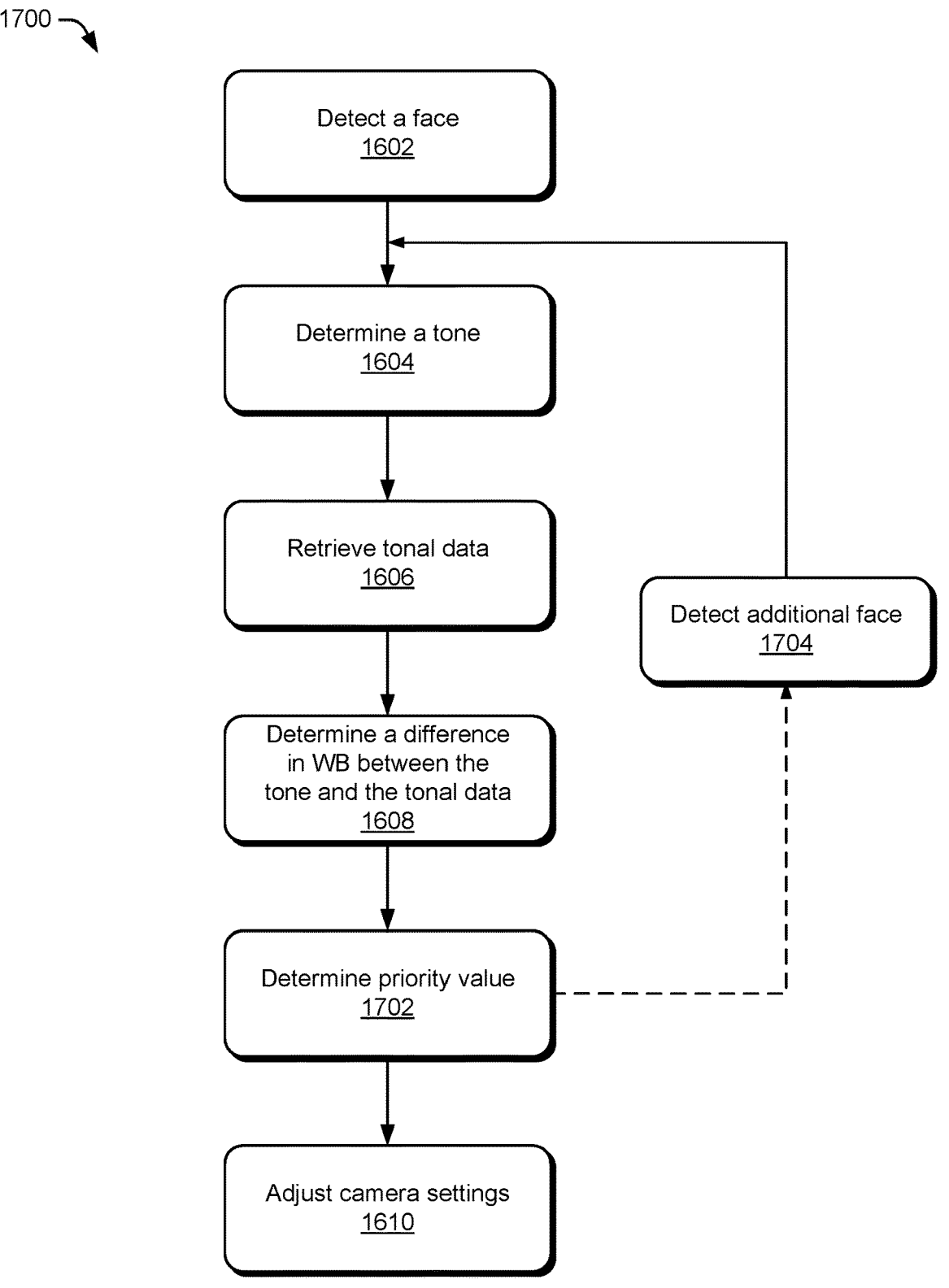
FIG. 17 illustrates another example method of AWB for a camera system.

FIG. 17 illustrates an example method of AWB for a camera system where one or more additional detected faces are detected within the precursor image. Similar to the method illustrated in FIG. 16, at 1602 a detected face is detected within a precursor image. At 1604, a tone is determined for the detected face within the precursor image and tonal data associated with the detected face is retrieved. At 1608, a difference in WB is determined between the tone of the detected face and the tonal data associated with the detected face. Unlike in FIG. 16, a priority value associated with the detected face is determined. The priority value is used to determine the importance of the detected face within the precursor image. The priority value may be determined based on the tonal data, the precursor image, or a combination of the two. For example, a detected face may be given a higher priority value if the tonal data associated with the detected face includes a higher face-frequency value, which indicates that the detected face is often captured by the camera system. In addition, or separately, a detected face may be given a higher-priority value if the detected face has a larger face size within the precursor image.

Optionally, at 1702, an additional face may be detected within the precursor image. At 1604, a tone will be determined for the additional face and tonal data associated with the additional face will be retrieved at 1606. At 1608, an additional difference in AWB will be determined based on the difference in the tone of the additional detected face within the precursor image and the tonal data associated with the additional detected face. At 1704, a priority value of the additional detected face is determined. The method may optionally detect an additional face within the precursor image at 1702 and repeat the steps for the additional detected face, or adjust camera settings at 1610. If the camera settings are adjusted, the adjustment may be based on a combination of the differences in WB and the priority values of the detected face and the additional detected face. The differences in WB and the priority values may be combined through any computational method, including weighted sums and filtering.

Figure 18:
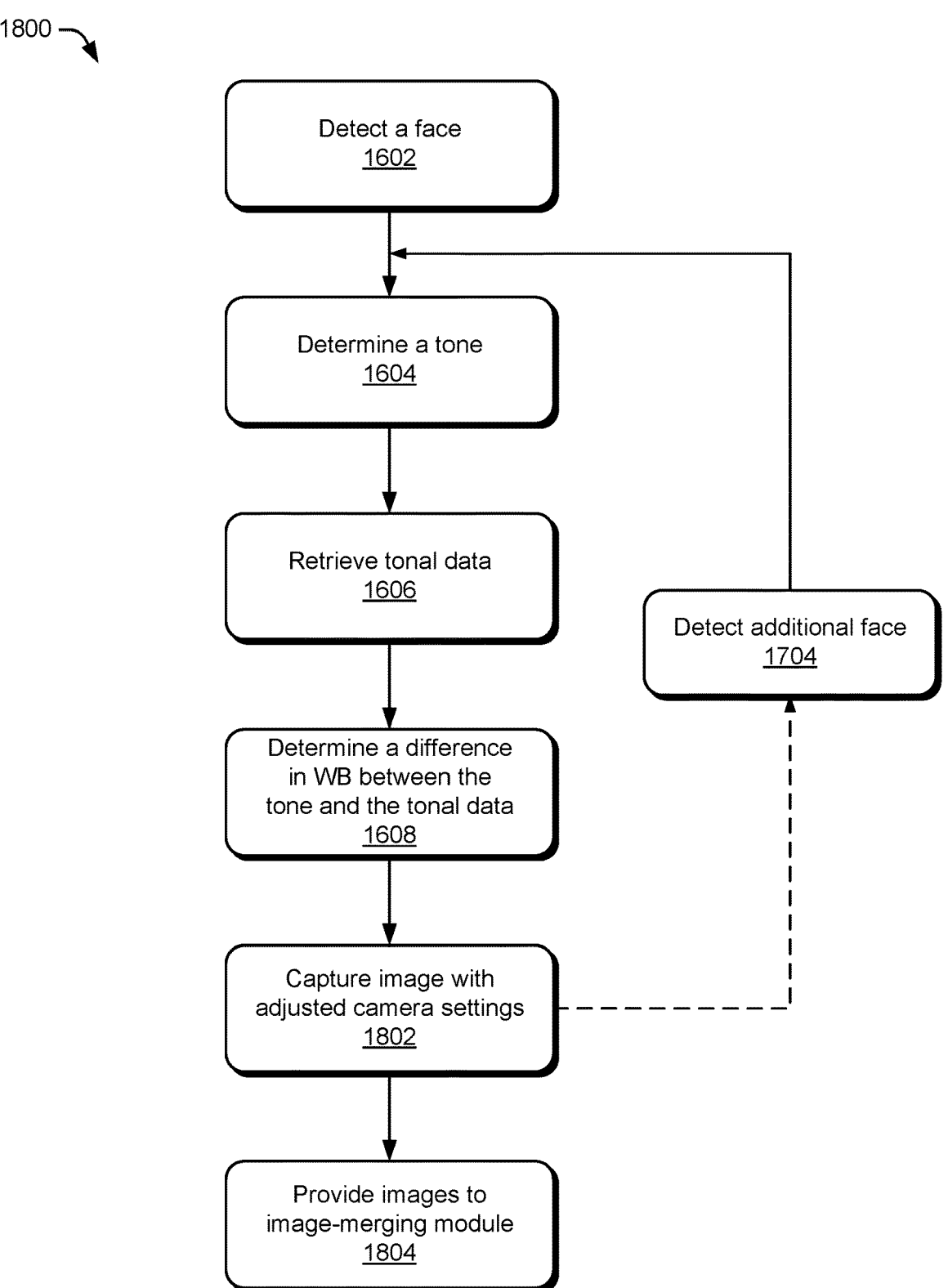
FIG. 18 illustrates another example method of AWB for a camera system.

FIG. 18 illustrates another example method of AWB for a camera system where one or more additional detected faces are detected within the precursor image. Like in FIG. 17, a first face is detected within a precursor image at 1602 and a tone is determined for the detected face within the precursor image at 1604. At 1606, tonal data associated with the detected face is retrieved and a difference in WB is determined between the tone of the detected face within the precursor image and the tonal data associated with the detected face. However, a priority value is not determined. Instead, at 1802 a first image with improved tone in the detected face is captured with adjusted camera settings based on the difference in WB. An additional detected face is detected within the precursor image at 1702, and the above steps are repeated for the additional detected face. As such, at 1608, an additional difference in WB is determined based on a tone of the additional detected face and tonal data associated with the additional detected face. At 1802, an additional image is captured with adjusted camera setting based on the additional difference in WB. The additional image has an improved tone in the additional detected face. An additional detected face may be detected within the precursor image and the steps may be repeated.

At 1804, the first image and the additional image are provided to an image-merging module. The image-merging module combines the first image and the additional image to produce a single image with improved tone. For example, the image-merging module may incorporate the first image for the detected face and the additional image for the additional detected face. As a result, the single image produced may have an improved tone in the detected face and the additional detected face. The single image may be provided to a display to be displayed digitally, stored in an electronic device, or both.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

Example 1: A method for automatic white-balance (AWB) in a camera system of an electronic device, the method comprising: detecting a first human face within a precursor image: determining a first tone of the first detected human face within the precursor image; retrieving first tonal data associated with the detected first human face, the first tonal data determined from a group of previous images captured in previous ambient conditions, the previous images determined to contain a same human face as the first detected human face; determining, based on the first tonal data, a first difference in white-balance (WB) between the first tone of the first detected human face within the precursor image and the first tonal data; and adjusting camera settings based on the first difference in WB, the adjusting enabling capture of an image having an improved tone.

Example 2: The method as recited by example 1, further comprising: detecting an additional human face within the precursor image; determining a tone of the additional detected human face within the precursor image; retrieving tonal data associated with the additional detected human face, the tonal data associated with the additional detected human face determined from a group of previous images captured in previous ambient conditions, the previous images determined to contain a same human face as the additional detected human face; determining, based on the tonal data associated with the additional detected human face, an additional difference in AWB between the tone of the additional detected human face within the precursor image and the tonal data associated with the additional detected human face; and wherein adjusting camera settings is based on the first difference in WB and the additional difference in WB.

Example 3: The method as recited by example 2, further comprising: determining a first priority value of the first detected human face within the precursor image; determining an additional priority value of the additional detected human face within the precursor image; and wherein adjusting camera settings is based on a weighted sum of the first difference in WB weighted by the first priority value and the additional difference in WB weighted by the additional priority value.

Example 4: The method as recited by example 3, wherein: determining the first priority value is based on a first size of the first detected human face within the precursor image; and determining the additional priority value is based on a size of the additional detected human face within the precursor image.

Example 5: The method as recited by example 3, wherein: determining the first priority value is based on a first determined face-frequency value, the first determined face-frequency value based on the number of previous images determined to contain a same human face as the first detected human face; and determining the additional priority value is based on a determined face-frequency value of the additional detected human face, the determined face-frequency value of the additional detected human face based on the number of previous images determined to contain a same human face as the additional detected human face.

Example 6: The method as recited by example 2, wherein: detecting an additional human face includes detecting up to 19 human faces; and determining an additional priority value includes determining up to 19 priority values.

Example 7: The method as recited by example 1, wherein adjusting camera settings causes the electronic device to capture a first image having the first detected human face with an improved tone: and further comprising: detecting an additional human face within the precursor image; determining a tone of the additional detected human face within the precursor image; retrieving tonal data associated with the additional detected human face, the tonal data associated with the additional detected human face determined from a group of previous images captured in previous ambient conditions, the previous images determined to contain a same human face as the additional detected human face; determining, based on the tonal data associated with the additional detected human face, an additional difference in AWB between the tone of the additional detected human face within the precursor image and the tonal data associated with the additional detected human face; adjusting camera settings based on the additional difference in WB causing the electronic device to capture an additional image having the additional detected human face with an improved tone; providing the first and additional images to an image-merging module to produce a single image incorporating the first image for the first detected human face and the additional image for the additional detected human face.

Example 8: The method as recited by example 1, wherein the first tonal data includes a confidence value, the confidence value based on; a face size of the same human face as the first detected human face within the previous images determined to contain a same human face as the first detected human face: or ambient light conditions within the previous images determined to contain a same human face as the first detected human face.

Example 9: The method as recited by example 8, wherein determining the first difference in WB is based on filtered first tonal data, the filtered first tonal data being a subset of the first tonal data having been filtered by the confidence value.

Example 10: The method as recited by example 8, wherein determining the first difference in WB is based on a weighted sum of the first tonal data weighted by the confidence value.

Example 11: The method as recited by example 1, wherein detecting the first human face within the precursor image is initiated by an actuator.

Example 12: The method as recited by example 1, wherein adjusting camera settings causes the electronic device to capture an image having an improved tone.

Example 13: The method as recited by example 12, further comprising providing the image having an improved tone to a display.

Example 14: The method as recited by example 1, wherein adjusting camera settings includes adjusting: a red sensor gain; a green sensor gain; or a blue sensor gain.

Example 15: The method as recited by example 1, wherein detecting a first human face includes using a low-resolution sensor.

Example 16: A camera system in an electronic device capable to perform automatic white balance (AWB) comprising: a processor; computer readable media; sensors capable of capturing a precursor image; a face frequency module capable of detecting a human face within an image; storage capable of storing previous images; a tone determination module capable of determining a tone of a detected human face; and a white-balance controller capable of adjusting camera settings.

CONCLUSION

Although aspects of AWB for a camera system have been described in language specific to features and/or methods, the subject of the appended claims is not necessarily limited to the specific features or methods described. Rather, the specific features and methods are disclosed as example implementations of the claimed AWB for a camera system, and other equivalent features and methods are intended to be within the scope of the appended claims. Further, various aspects are described, and it is to be appreciated that each described aspect can be implemented independently or in connection with one or more other described aspects.

What is claimed is:

1. A method for automatic white-balance (AWB) in a camera system of an electronic device, the method comprising:

detecting a first human face within a precursor image;

determining a first tone of the first detected human face within the precursor image;

retrieving first tonal data associated with the detected first human face, the first tonal data determined from a group of previous images captured in previous ambient conditions, the previous images determined to contain a same human face as the first detected human face;

determining, based on the first tonal data, a first difference in white-balance (WB) between the first tone of the first detected human face within the precursor image and the first tonal data; and adjusting camera settings based on the first difference in WB, the adjusting enabling capture of an image having an improved tone, the improved tone more-closely matching the first tonal data than the first tone.

2. A method as in claim 1, further comprising:

detecting an additional human face within the precursor image;

determining an additional tone of the additional detected human face within the precursor image;

retrieving additional tonal data associated with the additional detected human face, the additional tonal data associated with the additional detected human face determined from another group of previous images captured in previous ambient conditions, the other group of previous images determined to contain a same human face as the additional detected human face;

determining, based on the additional tonal data associated with the additional detected human face, an additional difference in AWB between the additional tone of the additional detected human face within the precursor image and the additional tonal data associated with the additional detected human face; and wherein adjusting camera settings is based on the first difference in WB and the additional difference in WB.

3. A method as in claim 2, further comprising:

determining a first priority value of the first detected human face within the precursor image; and determining an additional priority value of the additional detected human face within the precursor image, wherein adjusting camera settings is further based on a weighted sum of the first difference in WB weighted by the first priority value and the additional difference in WB weighted by the additional priority value.

4. A method as in claim 3, wherein:

determining the first priority value is based on a first size of the first detected human face within the precursor image; and determining the additional priority value is based on a size of the additional detected human face within the precursor image.

5. A method as in claim 3, wherein:

determining the first priority value is based on a first determined face-frequency value, the first determined face-frequency value based on a quantity of previous images in the group of previous images that are determined to contain a same human face as the first detected human face; and determining the additional priority value is based on an additional determined face-frequency value of the additional detected human face, the additional determined face-frequency value of the additional detected human face based on a quantity of previous images in the other group of previous images that are determined to contain a same human face as the additional detected human face.

6. A method as in claim 2, wherein:

detecting an additional human face includes detecting up to 19 human faces; and determining an additional priority value includes determining up to 19 priority values.

7. A method as in claim 1, wherein adjusting camera settings causes the electronic device to capture a first image having the first detected human face with an improved tone, and further comprising:

detecting an additional human face within the precursor image;

determining an additional tone of the additional detected human face within the precursor image;

retrieving additional tonal data associated with the additional detected human face, the additional tonal data associated with the additional detected human face determined from another group of previous images captured in previous ambient conditions, the other previous images determined to contain a same human face as the additional detected human face;

determining, based on the additional tonal data associated with the additional detected human face, an additional difference in AWB between the additional tone of the additional detected human face within the precursor image and the additional tonal data associated with the additional detected human face;

adjusting camera settings based on the additional difference in WB causing the electronic device to capture an additional image having the additional detected human face with another improved tone; and providing the first and additional images to an image-merging module to produce a single image incorporating the first image for the first detected human face and the additional image for the additional detected human face.

8. A method as in claim 1, wherein the first tonal data includes a confidence value, the confidence value based on:

a face size of the same human face as the first detected human face within the previous images determined to contain a same human face as the first detected human face; or ambient light conditions within the previous images determined to contain a same human face as the first detected human face.

9. A method as in claim 8, wherein determining the first difference in WB is based on filtered first tonal data, the filtered first tonal data being a subset of the first tonal data having been filtered by the confidence value.

10. A method as in claim 8, wherein determining the first difference in WB is based on a weighted sum of the first tonal data weighted by the confidence value.

11. A method as in claim 1, wherein detecting the first human face within the precursor image is initiated by an actuator.

12. A method as in claim 1, wherein adjusting camera settings causes the electronic device to capture an image having the improved tone.

13. A method as in claim 12, further comprising providing the image having the improved tone to a display.

14. A method as in claim 1, wherein adjusting camera settings includes adjusting:

a red sensor gain;

a green sensor gain; or a blue sensor gain.

15. A method as in claim 1, wherein detecting a first human face includes using a low-resolution sensor.

16. A device comprising:

a processor; and a non-transitory computer-readable media comprising instructions which, when executed by the processor, cause the processor to carry out operations comprising:

detecting a first human face within a precursor image;

determining a first tone of the first detected human face within the precursor image;

retrieving first tonal data associated with the detected first human face, the first tonal data determined from a group of previous images captured in previous ambient conditions, the previous images determined to contain a same human face as the first detected human face;

determining, based on the first tonal data, a first difference in white-balance (WB) between the first tone of the first detected human face within the precursor image and the first tonal data; and adjusting camera settings based on the first difference in WB, the adjusting enabling capture of an image having an improved tone, the improved tone more-closely matching the first tonal data than the first tone.

17. The device of claim 16, the operations further comprising:

detecting an additional human face within the precursor image;

determining an additional tone of the additional detected human face within the precursor image;

retrieving additional tonal data associated with the additional detected human face, the additional tonal data associated with the additional detected human face determined from another group of previous images captured in previous ambient conditions, the other group of previous images determined to contain a same human face as the additional detected human face;

determining, based on the additional tonal data associated with the additional detected human face, an additional difference in AWB between the additional tone of the additional detected human face within the precursor image and the additional tonal data associated with the additional detected human face; and wherein adjusting the camera settings is based on the first difference in WB and the additional difference in WB.

18. The device of claim 17, the operations further comprising determining a first priority value of the first detected human face within the precursor image and an additional priority value of the additional detected human face within the precursor image, wherein adjusting the camera settings is based on the first priority value and the additional priority value.

19. The device of claim 18, wherein adjusting the camera settings is based on a combination of the first difference in WB and the additional difference in WB, the combination being determined using the first priority value and the additional priority value.

20. A non-transitory computer-readable storage medium comprising instructions which, when executed by one or more processors, cause the one or more processors to carry out functions comprising:

detecting a first human face within a precursor image;

determining a first tone of the first detected human face within the precursor image;

retrieving first tonal data associated with the detected first human face, the first tonal data determined from a group of previous images captured in previous ambient conditions, the previous images determined to contain a same human face as the first detected human face;

determining, based on the first tonal data, a first difference in white-balance (WB) between the first tone of the first detected human face within the precursor image and the first tonal data; and adjusting camera settings based on the first difference in WB, the adjusting enabling capture of an image having an improved tone, the improved tone more-closely matching the first tonal data than the first tone.

\*   \*   \*   \*   \*